J. J. ADGATE.
Nut-Lock.

No. 159,136. Patented Jan. 26, 1875.

WITNESSES
Henry N. Miller
C. L. Eueh

INVENTOR
Joseph J. Adgate,
per Alexander Mason
ATTORNEYS

UNITED STATES PATENT OFFICE.

JOSEPH J. ADGATE, OF STEVENSVILLE, NEW YORK, ASSIGNOR OF THREE-FOURTHS HIS RIGHT TO JOHN MAITLAND, J. H. STERNBERGH, AND CALEB WHEELER, OF READING, PENNSYLVANIA.

IMPROVEMENT IN NUT-LOCKS.

Specification forming part of Letters Patent No. 159,136, dated January 26, 1875; application filed December 12, 1874.

*To all whom it may concern:*

Be it known that I, JOSEPH J. ADGATE, of Stevensville, in the county of Sullivan and in the State of New York, have invented certain new and useful Improvements in Nut-Locks; and do hereby declare that the following is a full, clear, and exact description thereof, reference being had to the accompanying drawings and to the letters of reference marked thereon, making a part of this specification.

My invention relates to that class of nut-locking devices in which a plate or bar is placed over a series of nuts, to keep the same from turning; and the nature of my invention consists in cutting away certain portions of the nut at each end of the series, or any one or more of them, on the inner side of the corners, so as to allow of said nut or nuts being turned a trifle in the direction of unscrewing, and the body of the nut or nuts at the corners thereby overlapping the plate or bar, and locking the same.

In order to enable others skilled in the art to which my invention appertains to make and use the same, I will now proceed to describe its construction and operation, referring to the annexed drawing, in which—

Figure 1:
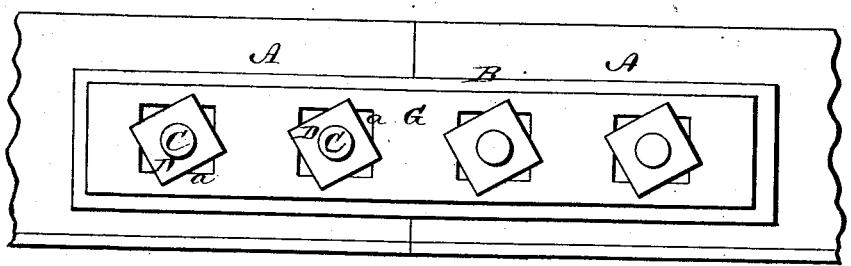
Figure 2:
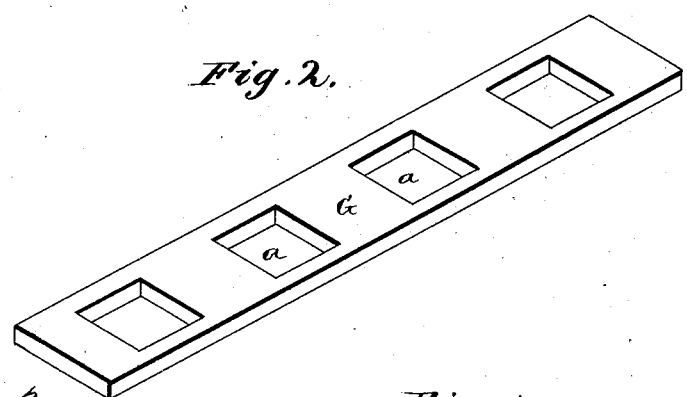
Figure 3:
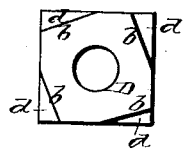
Figure 4:
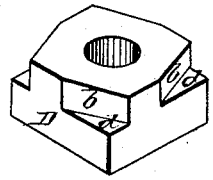

Figure 1 is a side view of a railroad-splice embodying my invention. Fig. 2 is a perspective view of the plate or bar. Fig. 3 is an inside view; and Fig. 4 a perspective view of the cut-away nut.

A A represent the ends of two railroad-rails; B, the ordinary fish-bar; C C, the bolts; and D D the nuts. G represents the plate provided with apertures $a\,a$, of such size and form as to fit over the nuts D D, when the same have been placed and screwed up on the bolts C C. The nuts D D are cut away at the corners on the inner side the thickness of the plate G, forming the inclines $b\,b$, as shown fully in Figs. 3 and 4. After the nuts D have been screwed up tightly, and the plate G placed over them, as above described, the nuts can be turned toward the left, or in the direction of the unscrewing, a small trifle bringing the inclines $b$ against the sides of the apertures $a$, and the corners $d$ of the nuts on the outside of the plate holding the plate immovably in place.

It will thus be seen that while the nuts hold or lock the plate, the plate locks the nuts and prevents them from unscrewing.

To remove the nuts, they must first be screwed up so as to be square with the holes $a$ in the plate, when the plate can be taken off and the nuts afterward unscrewed.

This nut-lock may be used in any place where two or more bolts and nuts are grouped together, and any one or more of the nuts may be cut out, as described, to lock the nut.

The nuts D may be made square, as shown, or with any number of sides, but not round, and the apertures in the plate be made to correspond.

I am aware that a rectangular-shouldered nut is not new. I am also aware that a locking-plate with rectangular openings, is, of itself, not new.

Having thus fully described my invention, what I claim as new, and desire to secure by Letters Patent, is—

In combination, with the locking-plate G, the nut D, having the diagonal cuts or chamfers $b\,d$ arranged so that the nut can only be turned backward, to secure the plated nut after the locking-plate is placed over the nut, as set forth.

In testimony that I claim the foregoing I have hereunto set my hand this 11th day of December, 1874.

JOSEPH J. ADGATE.

Witnesses:
C. M. ALEXANDER,
H. A. HALL.